(12) United States Patent
Buja

(10) Patent No.: US 6,649,095 B2
(45) Date of Patent: Nov. 18, 2003

(54) METHOD AND APPARATUS FOR CONTROLLING A MOLD MELT-FLOW PROCESS USING TEMPERATURE SENSORS

(76) Inventor: Frederick J. Buja, 323 Pattonwood Dr., Rochester, NY (US) 14617

( * ) Notice: Subject to any disclaimer, the term of this patent is extended or adjusted under 35 U.S.C. 154(b) by 0 days.

(21) Appl. No.: 10/008,083

(22) Filed: Nov. 5, 2001

(65) Prior Publication Data

US 2002/0084543 A1 Jul. 4, 2002

Related U.S. Application Data

(60) Provisional application No. 60/246,160, filed on Nov. 6, 2000.

(51) Int. Cl.⁷ .............................................. B29C 45/78
(52) U.S. Cl. .................. 264/40.6; 264/328.1; 425/144; 425/145
(58) Field of Search ............................... 264/40.1, 40.6, 264/328.1, 328.8; 425/144, 145, 564, 570, 572

(56) References Cited

U.S. PATENT DOCUMENTS

| | | | |
|---|---|---|---|
| 4,715,221 A | 12/1987 | Grims et al. | |
| 4,721,589 A | 1/1988 | Harris | |
| 4,816,197 A | 3/1989 | Nunn | |
| 4,848,147 A | 7/1989 | Bailey et al. | |
| 4,850,217 A | 7/1989 | Nunn | |
| 4,932,250 A * | 6/1990 | Assaf et al. | 374/32 |
| 4,983,336 A | 1/1991 | Langlois | |
| 5,320,513 A | 6/1994 | Schmidt | |
| 5,419,858 A | 5/1995 | Hata et al. | |
| 5,665,283 A | 9/1997 | Bader et al. | |
| 5,707,659 A * | 1/1998 | Erikson | 425/130 |
| 5,772,933 A | 6/1998 | Kotzab | |
| 5,902,252 A | 5/1999 | Hohlfeld et al. | |
| 5,945,046 A | 8/1999 | Hehl et al. | |
| 5,959,195 A | 9/1999 | Gottfert | |
| 5,980,237 A | 11/1999 | Swenson et al. | |
| 5,993,704 A | 11/1999 | Bader | |
| 6,006,601 A | 12/1999 | Osborne | |
| 6,090,318 A | 7/2000 | Bader et al. | |
| 6,293,700 B1 * | 9/2001 | Lund et al. | 374/181 |

OTHER PUBLICATIONS

"Usining Mold Opening to Relate the Molding Process to Molded Product"; Frederick J. Buja; K–Technologies; 64 Commercial St., Rochester, NY, 14614, (c) 1988.

"Using Pressure Transducerws to Improve Control of the Extrusion Process"; Dynisco; Technical Reference; pp. 170–174.

"Selecting the Right thermocouple: There Are More Choices Today"; Reprinted from 'Plastics Technology'; NANMAC Corporation; www.nanmac.com; (c) 1998.

"Temperature Sensors for Industry"; www.noraltemperaturesensor.com; Noral, Inc.

"Heaterless Injection Machine Nozzles"; Dynisco Instruments; www.dynisco.com.

(List continued on next page.)

*Primary Examiner*—Jill L. Heitbrink
(74) *Attorney, Agent, or Firm*—Basch & Nickerson LLP; Duane C. Basch

(57) ABSTRACT

The present invention is a method and apparatus for controlling a mold flow process using inner (impinge) and/or edge temperature sensors, wherein articles processed in a constraining mold cavity, having a constant melt "shrink" quality, can be obtained even with fluctuations in resin "melt" properties (flowability). At least one temperature-dependent output or "trigger" signal is sampled, and the level of the signal (e.g., temperature) initiates at least one step in the molding cycle. Using a sampling circuit, thermal waveforms are obtained from thermal sensor array data such that if a sequence of melt temperature set-point trigger times fluctuates outside control limits, then the process melt-flow is judged as a hotter/faster melt-flow or cooler/slower melt-flow injection process.

16 Claims, 12 Drawing Sheets

OTHER PUBLICATIONS

"Temperature Control Builds Better Injection Molding", 'Quality Magazine' May 2000, www.qualitymag.com/articles/2000/may00/0500f3.asp: James R. Koelsch, Contributing Editor.

An Adaptive Control Methology for the injection Molding Process. Part 2: Experimental Application; Robert E. Nunn & Himanshu R. Sheth; Journal of Injection Molding Technology; Sep. 7, 2001; vol. 5, No. 3, pp. 141–151.

"P–T Sensor for Mold Cavity Pressure and Temperature"; Kistler;.

"Nozzle Pressure Measuring Chain for Injection Molding Machine"; Kistler;.

"Establishing the Molding Process and Molded Product Consistency", Fred J. Buja, P.E.; Revised–Jun. 1990; Presented last by Fred J. Buja, in Chicago at National Plastics Expo; Jun. 1994.

* cited by examiner

METHOD AND APPARATUS FOR CONTROLLING A MOLD MELT-FLOW PROCESS USING TEMPERATURE SENSORS

CROSS-REFERENCE TO RELATED APPLICATION

The following related application is hereby incorporated by reference for its teachings:

"METHOD AND APPARATUS FOR CONTROLLING A MOLD MELT-FLOW PROCESS USING TEMPERATURE SENSORS METHOD AND APPARATUS FOR CONTROLLING A MOLD MELT-FLOW PROCESS USING TEMPERATURE SENSORS," Frederick J. Buja, U.S. Provisional Application No. 60/246,160, filed Nov. 6, 2000.

This invention relates generally to a method and apparatus for controlling molding-process, melt-volume conditions, and more particularly to the control of molding conditions so that molded articles of uniform volumetric consistency and quality are obtained at all times irrespective of fluctuations in melt-flow properties of mold resin in injection molding machines, including injection-molding machines that employ a hot-runner system.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY OF THE INVENTION

The present invention is directed to the control of mold cavity melt conditions in injection molding systems so that molded articles of uniform consistency and quality are produced at all times irrespective of fluctuations in the flow properties of mold resin. The present invention relies upon novel methods and techniques for sensing and monitoring a temperature profile at one or more locations in a molding system. In one embodiment, the invention contemplates the use of an injection molding support sensor array system (machine & mold) throughout a molding process, including start-up, purge, operation, etc.

Heretofore, a number of patents and publications have disclosed systems and methods for the control of injection-molding equipment, the relevant portions of which are hereby incorporated by reference and which may be briefly summarized as follows:

U.S. Pat. No. 5,419,858 to Hata et al., issued May 30, 1995, discloses a system and method for automating the sensing of flow properties of a resin material and the adjustment of molding conditions (e.g., temperature).

The article "Temperature Control Builds Better Injection Molding, by James R. Koelsch, published in the magazine *Quality* in May 2000, describes the monitoring and control of temperature as a critical parameter in an injection molding process.

The Dynisco Technical Reference, $42^{nd}$ Issue, Section Nine "The Importance of Accurate Melt Temperature Measurements in Extrusion" (ref. Pg. 171) states that the thermal degradation of polymers is a time-temperature degradation. The degradation curves are shown therein. The "Variations In Temperature and Residence Time During Extrusion" are explained. The importance of accurate melt temperature measurements is in relation to the original material and "Regrind" percentage being used. The conclusions are based on a large thermocouple sensor mass that is used at the edge and moved in a melt stream.

In injection-molding machines the cyclic thermal-mechanical operating precision and stability of the equipment has been greatly improved through improvements in the control circuitry used and the use of "real-time" closed-loop machine process control. However, the plastic material or "melt" used to mold a part, in the injection molding industry, is produced by a complicated polymerization reaction. The occurrence of some variance in the "melt" and "flow" properties of the plastic material cannot be avoided due to variances in the raw material and difficulties in controlling the polymerization reaction. In particular, in resin materials produced by the batch method, maintaining the material properties constant from one batch to another is extremely difficult.

For example, the value of the melt-flow index (MFI—determined using a five minute static state and five minute "melt" extruding time test) often fluctuates by approximately 10% with respect to the specified value for a particular material. Furthermore, in the case of a colored material, there is of course a variance in properties from one color to another due to differences in the pigments and the compounding of additives.

Even if the control precision of an injection-molding machine is improved, a disparity of density, and quality, in the molded articles develops because a fluctuation in resin "melt-flow" effects the "shrink" properties. In particular, a fluctuation in the quality (dimension, weight, density, warping etc.) of the molded articles arises when resin "melt-flow" lots are changed over from one to another. Accordingly, a technician must often monitor the molding machine (e.g., FIG. 2A, 198) and mold temperature at all times and address any fluctuation in resin "meltflow" properties. And the technician must try to adjust for the melt process variance. The molding process is a cyclic sequence starting from an "OPEN" static "free" thermal state, to a dynamic "CLOSE" thermal-mechanical injection state, and then followed by a mold "OPEN" to eject the molded part.

An object of the present invention is to automate the melt to mold exchange by monitoring thermal characteristics using a melt-flow temperature sensor(s). Such sensors may include edge temperature sensor(s) and inner melt-flow temperature sensor(s). As a result of Boyle's law, the resultant pressure-volume temperature "rise" may be used to monitor the molding system, and to control the process in an acceptable [Min-Mean-Max] Range. It is further contemplated that the temperature profiles may be recorded and analyzed with trend averaging and LAST-cycle readout, so as to contrast each melt process cycle relative to a predetermined temperature-time sequence control points (process limits). In a preferred embodiment, such a process will be able to identify possible "reject" parts and divert such parts for further inspection and/or widen the latitude of the process, if the sample is acceptable.

Another object of the present invention is to determine the input material temperature and moisture status after being loaded into the injection system hopper. A hydroscopic material must be properly conditioned by drying, otherwise the process produces parts with moisture "streaking" and "brittleness" and a commensurate reduction in the expected finished product performance.

Another object of the present invention is to stabilize the final melt/mold cavity volume and consistency of each cavity molded article's density by monitoring and controlling fluctuation in resin melt-flow property, through a systematic machine support and melt/mold temperature sensor array system. A system employing aspects of the present invention preferably monitors temperature during each OPEN and CLOSE operation, at one or more locations including: melt source nozzle orifice; mold cavity sprue; runner; gate to vent; and through OPEN mold time to part ejection.

The present invention provides a method of monitoring the indirect process support system and direct machine-to-mold melt temperatures, using inner melt and/or edge temperature sensor(s). In a full system monitoring embodiment, monitoring preferably proceeds from initial machine hopper material conditioning, screw return-melt, and melt-flow injection process, and molding stages of each cavity resin melt-flow. The system may further include processes and controls for independently shutting off gates for each mold cavity (e.g., gating) based upon melt temperature profile for an accepted melt-mold cavity volume.

The inventor has further discovered that temperature change impacts the machine applied mechanical clamp force on the melt/mold cavity volume to establish the molded product final thermal-mechanical "shrink" properties. The machine and mold material mechanical Modulus of Elasticity "E" (Force per unit area) lowers with increasing temperature, while the material thermal coefficient of expansion "e" (change in Length divided by initial Length times temperature change) rate increases with increasing temperature. Therefore, the temperature rise increases the material thermal "strain" (Length increase) and lowers the mechanical modulus (strength decrease).

In a typical molding cycle, molten material (melt-flow) exits a nozzle orifice and enters the mold sprue, the runner, and then passes through a small, gate restriction to fill and pack a cavity volume and cure, to form a product of varying density. The nozzle and each cavity gate orifice melt-flow length will vary with a lower viscosity (hotter) inner melt front and a higher viscosity (cooler) edge density characteristic. In accordance with the invention, the melt-flow inner and/or edge temperature sensor arrays measure the melt inner DYNAMIC to STATIC outer edge thermal exchange rate, in real time. Providing a gate melt shut-off means to each cavity that is responsive to a temperature sensor(s), preferably cuts off the machine injection process to maintain consistent cavity melt pack volume.

Engineering thermoplastics and new metal molding materials are processed at high temperatures and require close temperature control. The initial "zero" melt injection pressure begins to rise as the melt fills the mold cavity, and the pressure rises to a maximum level (or set-point) during the final pack volume, in the enclosed mold-cavity volume. Furthermore, the resin melt volumetric Bulk Modulus of Elasticity "K" varies from the molded part outer surface or "skin" to the inner center section, during each melt to mold cavity surface temperature cycle exchange. The volumetric Bulk Modulus "K" ratio of the hydraulic oil injection pressure (Ko=1% per 1,000 psi), steel machine/mold clamp force (Ks=⅓% per 1,000 psi) imposed during the machine/melt/mold volumetric exchange phases define the molded product "cured" melt material Bulk Modulus of Elasticity "Kmp."

Methods of monitoring a molding process according to the present invention comprise measuring a thermal melt-flow profile, using at least one temperature sensor, where the measurement of temperature may be employed in a nozzle. For example, where the orifice melt start "trigger" temperature set-point. An initialized system trigger, which may be time-dependent causes the system to monitor and store time profiles for a melt temperature profile as seen in FIG. 4, including a rise to peak and fall before an end scan time signal. Monitoring the temperature over a plurality of molding cycles, e.g., for each "OPEN" purge and "CLOSE" inject cycle of the molding melt-flow process, allows the system to characterize operation of the molding system and mold.

To prepare a melt shot size, a screw with angular flites and grooves is rotated within a heated barrel to set a barrel melt volume (BmV) shot size. The screw return time depends on the design groove depth, angle and shut off ring melt-flow area. Material is drawn from the hopper, into a barrel aperture, surrounded by a cooling water jacket. The material pellets slide forward within grooves in the rotating screw flites and pass the barrel rear (Br), center (Bc), and front (Bf) heated sections. The screw rotates and translates rearward in the barrel to a fixed screw length position. A hydraulic back-pressure applied to the retracting screw piston inputs added work heat into the contained material. A melt shot size is thereby produced ahead of the screw shut off ring. As the melted material is ejected via force applied to the barrel screw, the barrel melt volume exits a nozzle orifice and is injected into a closed mold cavity volume.

In one embodiment, the temperature sensor may be applied to the nozzle orifice to profile the exiting melt material. In accordance with an aspect of the present invention, the melt temperature-time profile starts when the melt "rise" temperature trigger set-point (iT1.1) is reached, to initialize a melt scan time (t1.1). When a second (preferably higher) temperature set-point (T1.2) is reached a second time (t1.2) is read. The differential melt rise time ($\Delta t1r$) is for a fixed melt temperature differential. The changes in melt trigger "rise" time (T1.2−T1.1=$\Delta T1r$), indicates the melt viscosity.

As will be described, the present invention includes a method to determine, with a thermocouple sensor array, the fluctuation in resin flow volume for a constant-volume melt-flow process. In accordance with the invention, it is possible to determine whether a "hotter" melt-flow or a "cooler" fluctuation of the melt-flow occurs, for the same injection molding process parameters. This makes it possible to identify a "Min-Mean-Max" melt temperature-time profile and a method to correlate the melt conversion and molding process to the molded product. Also, aspects of the present invention may be employed to identify the "Low" limit and "High" limit in a molding process range, and whether the process latitude can be expanded or process limit maintained. Accordingly, the present invention further includes a method for monitoring and controlling fluctuation in melt-flow in an injection-molding machine, via the measurement of the injection process time for the molding cycle.

The steps preferably include obtaining the degree of fluctuation in the measured melt-flow temperature from the OPEN "static" to the CLOSE "dynamic" mold states. A temperature trigger set-point is initialized to profile the temperature-time for both OPEN mold position melt "purge" and CLOSE "inject" melt/mold flow cavity volume.

It will be further appreciated that the melt-flow front, for example at the nozzle orifice, has an outside static "Edge" (e') and an "Inner" (i) dynamic melt-flow that stops with melt front "freeze off" (cavity short) or machine injection cut-off. A hydraulic pressure is applied to the piston at the rear end of the machine screw. The hydraulic pressure to screw melt injection pressure is proportional to the ratio of areas, usually 10:1. By applying a 1,000 psi hydraulic pressure to the screw, the internal barrel melt shot pressure (with a closed nozzle orifice) approaches 10,000 psi. The nominal machine hydraulic pressure is 2,000 psi.

The screw "purge" or "inject" melt-flow length establishes the orifice exit melt-flow volume. The barrel melt-flow rate increases in response to a reduction in the nozzle orifice area and each cavity gate area. The melt-flow rate changes the ratio of barrel area squared divided by the nozzle orifice area squared. Each cavity gate melt-flow rate is the ratio of barrel area squared divided by the gate area squared. Each gate melt-flow ratio may change with temperature and mold opening. As the melt cavity pressure builds, a melt/mold cavity opening is similarly increased.

Just as the melt temperature "rise" may be used to trigger a gate cut off, a subsequent melt temperature "fall" set-point may be employed to reinitialize the melt OPEN portion of the cycle. The first melt "fall" trigger initializing the time from scan start time. The melt "fall" time from the initial melt-flow trigger "start," and time change differential, indicates the degree of fluctuation for the total melt-mold process. And the temperature is monitored to determine if the melt temperature or time-temperature profile exceeds a predetermined limit (value) of "time" and "temperature" from the initialized melt trigger set-points. The step of controlling the "CLOSE" of each cavity by a gate "shut-off" action is made such that the actual melt injection "VOLUME" will approach a standard injection "VOLUME." If the degree of fluctuation in a melt (e.g. faster "hotter" or slower "cooler") is maintained within a predetermined melt/mold cavity flow volume the third pressure-volume rise temperature set-point signals the transition from the impinge fill to pack state.

According to the present invention, there is provided an apparatus for monitoring and controlling a process fluctuation in a mold cavity melt volume by a temperature sensor array property located in the mold cavity halves, the injection molding machine, and nozzle orifice.

One or more thermocouples located in the molding machine nozzle orifice area the nozzle extension and/or the sprue generate the initial output signal representing the melt-flow rise "trigger," to start the injection process. A mold sprue, runner, gate, vent and fill/pack temperature melt sensor array measures the actual melt/mold cavity melt-flow temperature-time sequence in a molding cycle.

Each mold cavity surface (tab) gate or sub-surface (tunnel) gate shut-off is suitable for stopping the delivery of a resin from the injection-molding machine into each cavity. One or more thermocouples in the melt temperature sensor array may be used as the triggering means. By measuring the resin edge temperature and inner melt front temperature via a melt impinge or inner sensor independent mold control can be achieved. The melt/mold sensor array injection-time measuring means of the present invention is a melt-flow temperature-time trigger sequence. The melt-flow volume is delivered from a nozzle orifice area into a mating mold sprue.

The sprue enters a closed mold cavity volume, created by the mold sprue "A" side and eject "B" side, created by a machine clamp force. The two mold halves preferably have a melt impinge and edge sensor array. In the mold OPEN position, the exposed cavity is read. In the CLOSED mold position, the created mold cavity volume and melt-flow input molding process inject and cure is read to mold the product. The product mold OPEN to part eject time is also measured.

The initial mold cavity area (cA) can be changed thermally by an increase $(cA \cdot [1+(cA \cdot 2e \cdot +\Delta T)])$ or decrease $(cA \cdot [1+(cA \bullet 2e \cdot \Delta T)])$ in mold cavity temperature. The cavity must be physically "customized" to match the melt-mold process "shrink" parameters, to achieve the desired final molded product dimension.

The inner melt sensor array measures the temperature-time mold melt-flow length, volumetric heat content and mold cavity heat exchange rate. The edge sensor array measures the melt/mold cavity temperature "rise" to peak and "fall" rate. The melt inner (impinge) to edge temperature "rise-peak-fall" differential characterizes the molded part process to product thermal strain. The larger the temperature differential, the larger the thermal "strain" in the final molded part.

The present molding process systems use machine hydraulic pressure, barrel and/or mold cavity melt pressure, ram position, and mold opening to stop mold cavity melt-flow. There are hot runner mold valve gate systems to stop the mold cavity melt-flow volume, as described, for example, in U.S. Pat. No. 5,419,858, issued May 30, 1995 for a "Method For Controlling Fluctuation In Flow Property Of Resin In Injection Molding Machine."

The present invention preferably controls each cavity melt volume using its associated gate melt impinge sensor as a gate trigger for the third pressure-volume "rise." The melt impinge sensor array vent triggers the second pressure-volume "rise," whereas the melt impinge sensor array fill to pack pressure-volume temperature "rise" signals the packing of the cavity. As the melt packing pressure acts on the mold parting line, the inner melt sensor moves during the inner melt temperature "rise" and enhances the inner impinge melt sensor array (iS-A) sensing of the mold part-line opening. The part line opening is a direct measurement of added mold melt volume (mV). An excess of melt may result in the mold cavity overflowing or "flash."

Each of the thermoplastic melt materials has a varying center density, such as the structural foams, polyurethane two-part foam processes, low density thermoplastic elastomer (TPE), high density metal injection molding, and high density thermosetting materials and can be profiled, where the force sensor fails. In accordance with an aspect of the present invention, each mold cavity may be implemented with a gate shut off means (preferably of a shear/punch type) that may be controlled independent of the traditional machine "melt-flow" injection process delivery time. By using a mold gate shut-off for each cavity, the resin "melt-flow sensor array" temperature-time profile for each cavity volume is maintained by an independent individual cavity melt-flow injection end time versus the machine injection end time for a total melt-flow cavity fill-pack volume. When the melt-flow temperature sensor has determined that the degree of required fluctuation is achieved (sensing temperature peak caused by cavity fill-pack pressure increase), the cavity melt-flow is stopped, before exceeding a predetermined range.

In accordance with the present invention, the injection pressure actually applied to the resin melt in an injection molding machine 198 is sensed by the impinge melt sensor array (iS-A). In the middle of the melt-flow, the melt temperature measured by the impinge (i) sensor changes as the melt injection pressure changes. This is in accordance with the thermodynamic "PV/T" [(Pressure×Volume)/Temperature] relationship of machine to mold volumetric exchange.

In accordance with the present invention, control is performed in such a manner that the resin melt volume is maintained by a shorter gate open time (to reduce the resin melt volume) and independent melt/mold flow injection time, in comparison to the standard machine injection time. Conversely, control is performed to lengthen the resin melt gate open time, or alarm if the machine system expires. As a result of such gate shut-off control, each mold cavity volume is independent of the machine injection time (i.e., resin flowability) to maintain, in each cavity, a substantially constant melt-flow volume. The standard melt-flow volume mentioned here refers to variable injection times measured under varying molding conditions in which molded articles exhibiting excellent quality are obtained. Accordingly, molded articles of excellent melt-flow volume quality are obtained at all times even if there is a fluctuation in the properties of the resin.

A further object of the present invention includes a method of controlling the resin melt/mold cavity volume fluctuation independent of the injection molding machine. By correlating the machine screw output volume to the position in the barrel during the mold cavity melt fill, any "loss" in injection melt volume efficiency is indicated. As wear is generated on the screw flites, shut-off ring, and barrel diameter, the melt-flow rate decreases. At a certain point the melt/mold cavity volume falls off to create a "short" molded part. Ref. U.S. Pat. No. 5,419,858, May 30, 1985. The degree of fluctuation determined between the typical machine hydraulic pressure and temperature of the exit melt volume determines the degree of melt-flow rate (volume per unit time) fluctuation. A faster initial hotter melt trigger "start" time and smaller "rise" time has a faster melt-flow and higher maximum temperature requires shortening inject time and/or lowering the applied hydraulic pressure. Conversely, a slower initial cooler melt trigger "start" time and larger "rise" time has a slower melt-flow and lower maximum temperature requires lengthening inject time and/or raising the applied hydraulic pressure.

In an embodiment of the present invention, the installed process and melt system sensor array temperature-time data is obtained by sampling and is temporarily stored in a memory in accordance with a sampling "initialize temperature" to "scan for the maximum temperature-time and minimum temperature-time" and "end temperature-time" sequence.

The techniques described herein are advantageous because the sensors are inexpensive and easy to install in a drilled hole. The smaller the sensor size, the better the sensor response to temperature within a machine barrel assembly and mold cavity assembly, and thereby monitor and control a melt-flow volume molding process. The techniques of the invention are advantageous because they provide a range of temperature and melt sensing alternatives, each of which is useful in appropriate situations. Some of the techniques can be used to monitor the injection-molding process, whereas other may be used to indicate abnormalities in the process or equipment. As a result of the invention, it will be possible to implement a constant-volume molding melt-flow temperature profile process, where the desired molding pressure (and therefore desired volume) is monitored and gate control output signal as a function of a final inner melt temperature rise.

The present invention will be described in connection with a preferred embodiment. However, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings.

Figure 1:
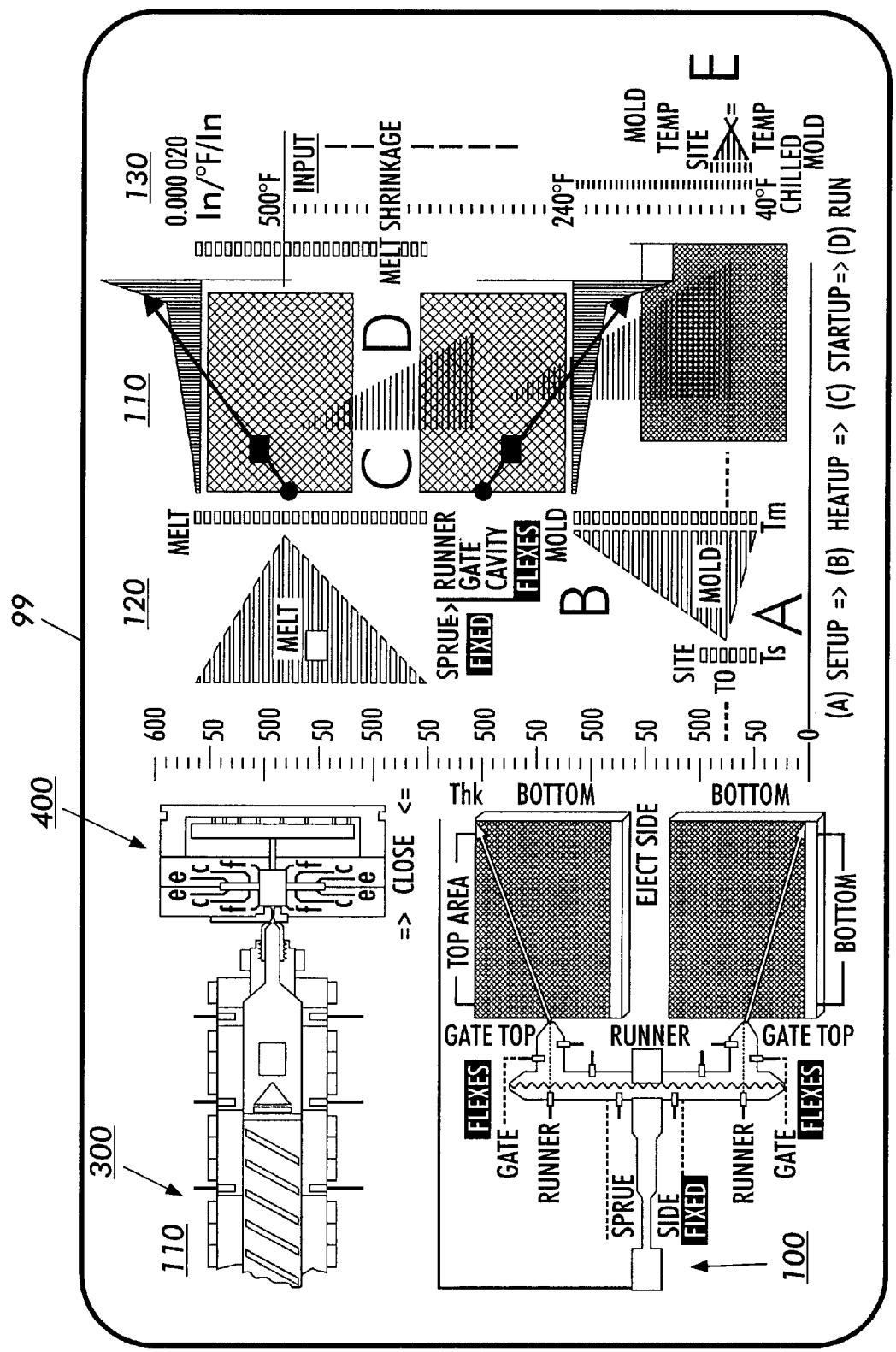
FIG. 1 illustrates a Machine-Melt-Mold Process interface in accordance with an aspect of the present invention.

Illustrated in FIG. 1 is a schematic layout of user interface 99 that may be employed to depict information collected in accordance with the present invention. In particular, the figure includes a two-cavity cold runner part 100 (lower left), barrel assembly to closed mold assembly (400) to profile a CLOSED mold "inject" profile (as depicted, for example in FIG. 5).

FIG. 1 illustrates the molded part 100 total inner melt-flow length. A cold-runner sprue, runner and gate melt/mold volume is depicted in region 100. A heated melt volume is contained in a hot-runner manifold. Cavity #1 melt/mold volume and cavity #2 melt/mold volume are determined by the delivered melt-flow length. The respective gate area determines each cavity melt-flow length and delivered melt-flow rate. Each cavity melt-flow arrival time initiates the first pressure-volume "rise." This determines the start of each cavity venting by the injected melt, cavity fill and pack (e.g., see FIG. 5).

In the upper left region, FIG. 1 also shows the mold close position, and illustrates a preferred temperature sensor array (e.g. edge and well Tc, Tc orifice dia., Tc Nozzle Bore). In accordance with aspects of the present invention, either the nozzle orifice or sprue temperature sensor may be used to initialize the melt "inject" temperature "rise" as described for melt "purge" or "inject." The sprue is the preferred sensor site in order to provide prolonged sensor life (where heaters may be added). The orifice inner melt-flow measures the dynamic temperature to the end of injection or "freeze" off. The sprue sensor reads the mold cavity melt-flow. Using the mold sprue may slightly reduce the sensitivity to melt-flow, because the mold temperature may be lower than the nozzle orifice. However, it is believed that locating at least one sensor near the entrance of the sprue will provide sufficient data.

The melt process system interface 110 (depicted along the right side) illustrates an exemplary process "test" menu or established "shrink" production progression. The mold sequence is; OPEN start, heat up, to process warm up cycle and steady state cycle. And CLOSE warm up cycle and settle into the molding process, and ejected molded part.

A molding process melt/mold cavity test "shrink" menu or production "shrink" menu is established for a molding system to process a material "residual" melt and "established" melt/mold shot size into a final mold cavity "shrink" volume. As will be appreciated by those knowledgeable in injection molding technology, the closed mold assembly cavity volume is machined to a specified molded part "shrink" dimension. The injected barrel melt volume (bmV) to melt/mold cavity volume (m/mcV), machine/melt/mold thermal cure process, determines the final mold cavity "shrink" dimension set for a production steady state process, within an established molded part cure "shrink" range.

The production "shrink" range of control determines the ease or difficulty to maintain the molding process. The process support and delivered melt system (e.g., temperatures, pressures, melt injection rate, cure time) defines the production "menu." Small changes in melt material, barrel/screw melt mixing, residence process time, and support equipment temperatures will vary the final "shrink" volume, density and dimension of the molded product.

Figure 2:
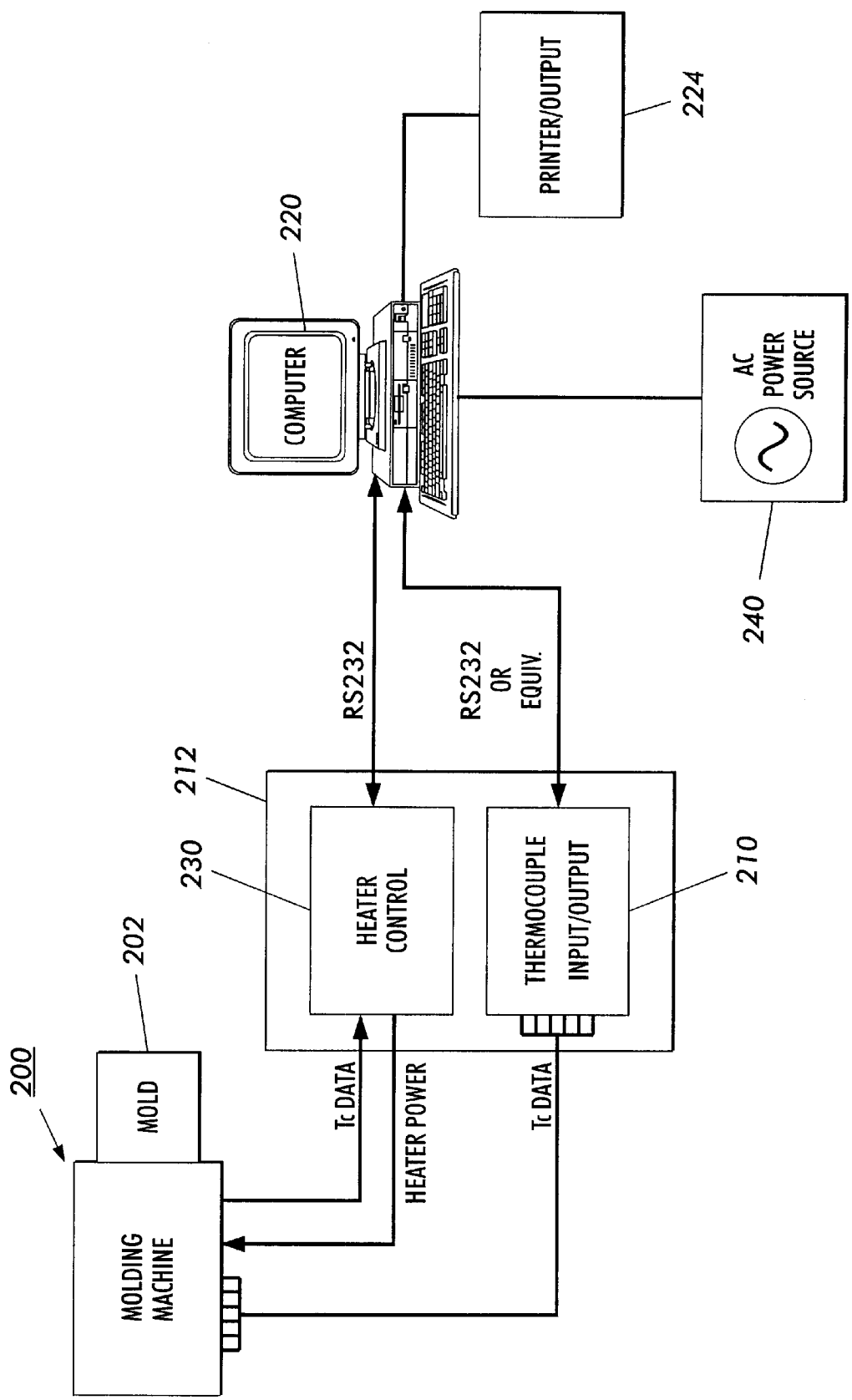
FIG. 2 is a representation of a stand-alone embodiment of an aspect of the present invention as interfaced to a molding machine.

It will be appreciated that the user interface may include alternative or additional display elements that may be depicted during one or more steps of the molding cycle, or during an analysis of the process. As depicted in FIG. 2, the display is generated on a computer or processor controlled display. Although FIG. 2 will be described with respect to a stand-alone sensor and display system, it is contemplated that such sensors and controls may be incorporated within, or communicate to, conventional injection molding control systems.

Referring now to FIG. 2, there is shown a schematic block diagram for a stand-alone embodiment of the present invention. In particular, FIG. 2 shows a molding machine 200 that includes a mold 202. As previously described, one or more thermocouple temperature sensors (not shown) are incorporated within machine 200. The sensors are interfaced to a thermocouple input/output block 210 in data control unit 212, where the signals may be amplified and stored for retrieval by computer 220. The I/O block 210 may be any suitable interface, as is well-known in temperature sensing systems, where the output of the thermocouples may be periodically sampled by the computer using an appropriate interface. The interface may be a serial (RS232) interface, a SCSI interface or equivalent interface for transferring data from the I/O block to the computer. It will be appreciated that block 210 may include signal amplification, noise elimination and short-term buffering capabilities in order to assure acquisition of the thermocouple data.

As shown in FIG. 2, the data control unit 212 and computer 220 may be powered from an AC power source 240. Also depicted within the control unit 212 is a heater control block 230. Heater control 230 is preferably a commercially available heater such as Fastheat or Watlow, and is employed in the present invention to provide supplemental heat to a region adjacent the placement of a sensor thermocouple in order to reduce the cooling of the melt material between molding cycles. Heater control 230 is a self-regulating heater, operating about a set temperature, so that the heater senses temperature via a thermocouple (not shown) and energizes or de-energizes a heater core (not shown) accordingly. It is also contemplated that computer 220 may include one or more peripheral output devices such as printer 224.

Figure 3A:
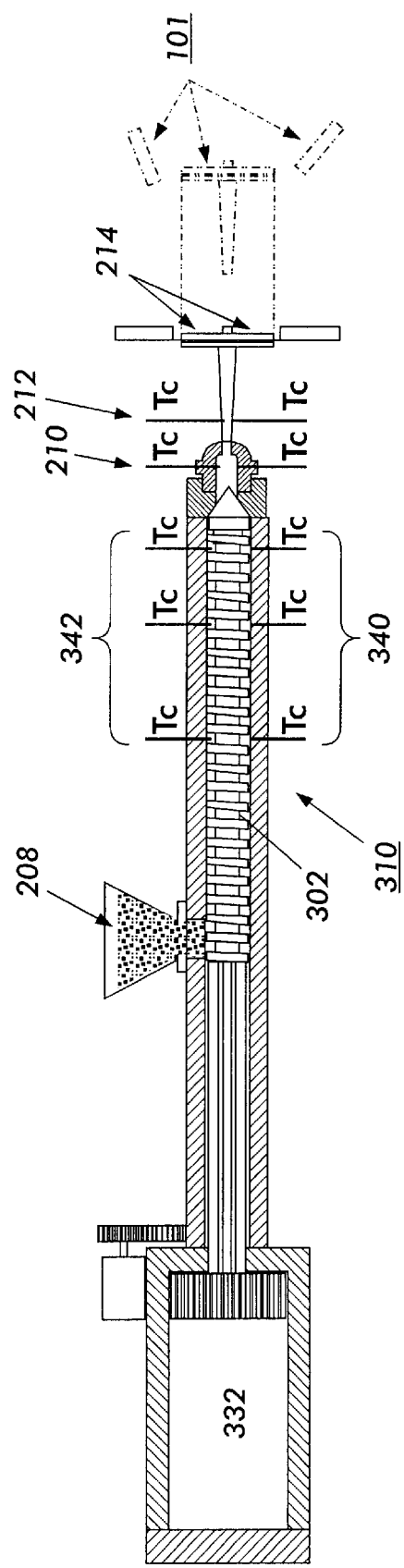
FIGS. 3A and 3B illustrate portions of mold machine barrel/screw, nozzle and mold and thermocouples therein in accordance with an aspect of the present invention.
Figure 3B:
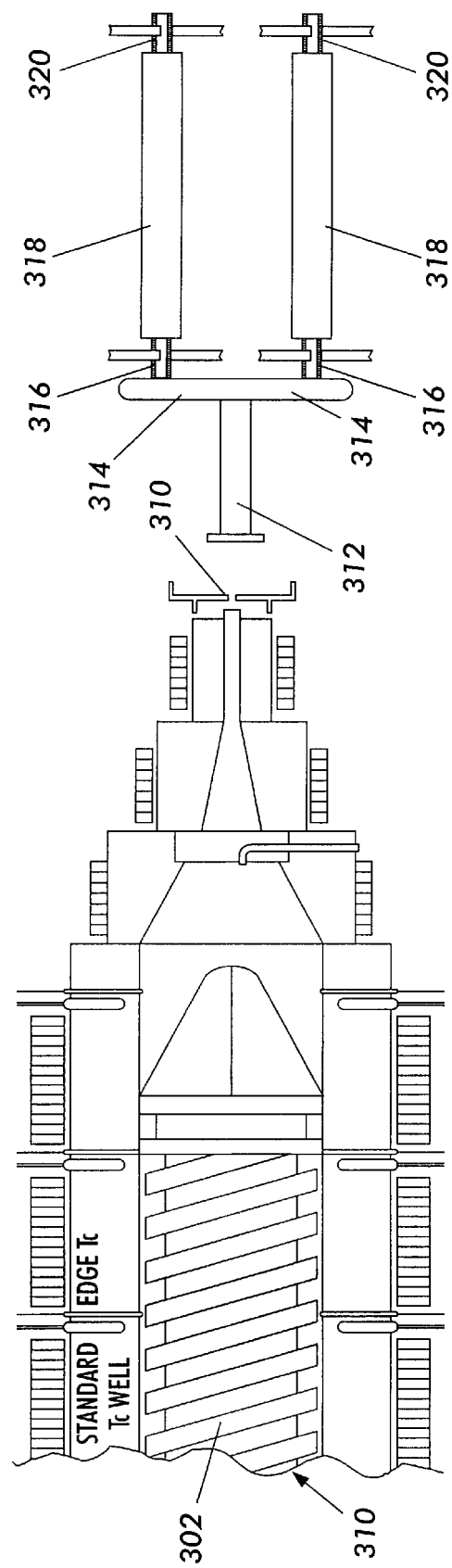

Turning now to FIGS. 3A and 3B, the molding process will be characterized in a general sense. Upon start, a preset melt material temperature is achieved by going through a heat up stage. With the barrel assembly 310 heated, a melt shot size is prepared by rotating the internal screw assembly 302 until a rear stop point is reached. An "air shot" or melt purge is then taken and another shot is prepared. If the molding process is delayed for any period of time, the melt shot is again purged to eliminate the "overheated" melt shot.

Figure 4:
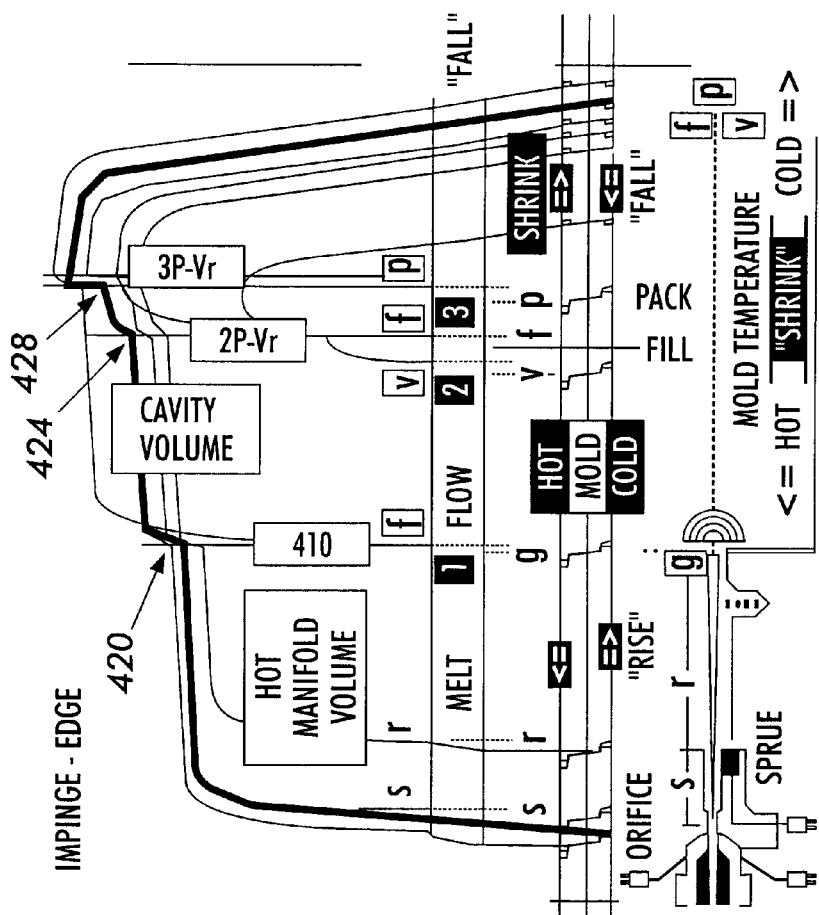
FIG. 4 is an exemplary illustration of an impinge orifice temperature-time profile on a user display in accordance with an aspect of the present invention.

Next, the mold is closed to initiate the mold clamp force and start the melt inject sequence. The proper machine clamp tonnage is set per the process support material/melt menu and the mold is reopened. The molding process is then run until the machine-melt-mold cyclic stabilized process state is achieved. The closed mold melt injection trigger "rise" to "peak" and "fall" sequence is shown in FIG. 4. The stabilized state has the smallest range of temperature excursion. Any prolonged delays destabilize the thermal rhythm and change the natural "undulations" seen in documenting a cyclic molding process.

The melt/mold cavity "inject" fill-to-pack sequence is defined by the melt-flow temperature profile measured, and by the mold melt-temperature set-point "rise" to "peak" and "fall" sequence. In one embodiment of the present invention, the system may be responsive to one or more of the thermocouples placed in the mold machine and associated mold. For example, the possible locations for melt thermocouples (both edge and/or impinge thermocouples) include inside a nozzle (310), inside a nozzle extension (310); inside a sprue (312); inside a cold/hot runner system (314); inside a gate(s) (316); inside a mold cavity (318); and end of cavity vent area (320).

The machine temperature sensors (nozzle and/or sprue) trigger the start melt-flow volume sequence. The mold sprue impinge-edge sensors trigger the start time melt-flow volume and mold part-line runner impinge-edge sensors which in turn trigger the start time melt-flow volume fill rate. As the two-gate impinge-edge sensors (316) sense the presence of mold material, the nozzle (310), sprue (312) and runner (314) sensors detect the first Pressure-Volume rise (FIG. 4, 410). More specifically, the temperatures sensed at the various points are illustrated by the profiles in FIG. 4.

Referring to FIG. 4, the temperature profiles recorded for the nozzle orifice (orifice) sprue (s), runner (r), gate (g), vent (v), fill (f) and pack (p) sensors are depicted. For example, as the melt material reaches the gate (curve g), the temperature rise of thermocouple 316, due to the melt material, is sensed and temperature rises. At the same time, a temperature rise is sensed at the orifice (310), sprue (impinge sensor 312) and runner sensors (314), as depicted at region 420, referred to as the first pressure-volume rise. In the event that the sprue is cold, and causes a freeze-off of the sprue orifice, a melt-flow stoppage will be indicated by a lower temperature at the sprue and an earlier pressure-volume rise in temperature will be recorded by the nozzle orifice sensor 310.

As the melt material reaches the vent at later time, the melt temperature rise is sensed by vent sensor 320 and temperature of profile v rises as shown on the exemplary illustration. At the same time a temperature rise, due to increased pressure, is sensed at the orifice, sprue (impinge), runner and gate sensors, as depicted by the second pressure-volume rise at region 424. As the melt-flow exits each cavity gate area, the melt begins to fill and pack each cavity. The cavity melt-flow fill rate determines the degree of temperature rise measured by the vent sensor array. The mold vent impinge-edge sensors sense the end of venting volume and triggers the start melt "fill" melt-flow. The melt/mold cavity fill volume increases and the mold "A" sprue (2s) side clamp force compresses the enclosed mold cavity "B" side volume. It will be appreciated that any difference in gate area will cause one cavity to fill sooner or later than the other. While FIG. 4 only depicts a single gate/cavity, it will be appreciated by those skilled in the art that there may be a disparity between the cavities, and that each gate/cavity would include its own gate and cavity thermocouples—and would generate profiles similar to those shown in FIG. 4. A smaller gate-one area has a higher melt shear heat and a longer cavity fill-pack time. A larger gate-two area has a lower melt shear heat and has a shorter cavity fill-pack time. The melt/mold cavity volume divided by gate area is the injected melt/mold cavity length. The machine nozzle orifice (o1) sensor array measures the total exit melt volume. Currently, variances between each mold cavity volume is accepted. However, with the ability to monitor the gate melt temperature profile in accordance with the present invention, an exact mechanism for measuring is provided by using the melt temperature sensor array to provide a thermal profile for each mold cavity melt/mold volume.

Continuing with FIG. 4, as the melt start cavities fill and pack at time, the temperature rise due to the melt material is sensed and temperature rises (f and p curves) in region 428. At the same time, a temperature rise is sensed by the nozzle impinge sensor (310), sprue (312), runner (314), and gate (316) sensors. The curves for each of the various sensors coincide in region 428 to depict the third pressure-volume rise. It may also be appreciated that the various sensors referred to may be in the form of highly responsive thermocouples, preferably having exposed junctions as will be described below.

As the melt-flow exits each cavity gate area, the melt begins to fill and pack each cavity. As the melt-flow volume enters each cavity gate area, the cavity melt-flow fill rate determines the temperature "rise" measured by the vent thermocouple and start of melt/mold cavity fill and pack is indicated. The mold fill temperature rise (region 428) triggers the melt "fill" melt-flow volume time.

In one embodiment, the vent sensor may be implemented with an edge sensor, as opposed to a melt impinge sensor). Accordingly, with an edge sensor the temperature rises as the melt fills the mold. At the instant of each cavity is filled by the melt material, the vent edge sensor will depict a second temperature "rise" as the injected melt-flow "front" begins to pack the cavity. In one embodiment, there is a second, impinge vent sensor 320, where the impinge vent sensor extends across the vent groove and contacts the opposite mold half. Upon start of melt cavity "pack," the impinge vent sensor losses contact with the opposite mold surface and the temperature reflected by the thermocouple initially "falls."

In accordance with one aspect of the present invention, the anticipated three pressure-volume rises may be used to measure and signal each cavity gating melt-flow start to pack volume, by relating melt/mold cavity temperature to the melt pressure (mP) and melt volume (mV). As noted previously, a key element of the present invention is the rise in melt temperature that results from the increased molding pressure as the melt moves through various stages of the injection cycle. Such a response is predicted by Boyle's Law, however, the key to sensing such a rise is to expose a thermocouple to the melt material directly, and to isolate the thermocouple from elements that would reduce the response (e.g., the outer edge of the melt flow where melt material is not moving and where the mass of the mold or equipment components moderates temperature). The gate melt pressure-volume rise (420) sets the start of cavity melt-flow. The end of cavity vent by the melt-flow, is the second pressure-volume rise (424) and signals or triggers start of melt fill. The mold cavity pack volume is the third pressure-volume rise (428) to end an accepted machine process "shrink" profile. Cutting the gate melt-flow off, before the actual machine injection process completion, for each cavity melt/mold volume, can control consistency of the molded parts, particularly as the mold cavity volumes change with melt temperature and process.

Having described the general operation of the present invention, attention is now turned to the operation of an exemplary embodiment of the invention, including a computer or software operating on a processor associated with the mold machine. As presently embodied, the software is referred to as TeMP•TRIG•SCAN recording and classification software. The software provides a method to monitor and compare the "profile" of different product runs to determine the quality/good vs. bad parts. Saving material, time, and down line sorting are just some of the benefits of this system. In a simple embodiment, the system consists of a temperature sensor mounted to a machine, an Adtech signal conditioning module (MTCT-327-C), the TeMP•TRIG•SCAN software and a standard PC running Microsoft Windows.

The system includes a temperature signal conditioning module (FIG. 2; 210), and the recording/data acquisition software to collect and display the data. Typically, the software allows a "trigger" at a fixed temperature, to begin recording the temperature until either the "termination temperature" is reached or a fixed amount of "recording time" has elapsed. Referring to FIG. 2, there are four components to the system:

a temperature sensor;

signal conditioning and acquisition equipment;

a standard PC running Microsoft Windows with a serial port; and data collection and display software.

Optional equipment includes a printer 224 for hard copy of the graphs, and removable data storage like a floppy disk to save screen snapshots for later reference.

As used in the current embodiment, the temperature sensors or thermocouples, are Type "J" (IRON—CONSTANTAN) thermocouples. It can be used in an oxidizing, inert, reduction or vacuum atmosphere. It is resistant to corrosion from the atmosphere. Iron oxidizes rapidly at temperatures exceeding 1,000° F., and therefore heavier gage wire is recommended for exposed temperature sensors. In a preferred embodiment, temperature sensor or thermocouple (e.g., 310) is made from small diameter sheathed wire. Although it may be possible to utilize thermocouples with a covered and grounded thermocouple junction type within the molding process, the present invention further includes a preferred method of manufacturing such thermocouples.

In particular, thermocouples 310, 312, etc. may be made from any well-known thermocouple wire, such as Omega-clad® Thermocouple Wire provided by Omega Corp. The wire is preferably about 0.040 inches in diameter and is of Type-J with an outer cover or sheath (#304-J-MO-040). To produce the thermocouple, the sheathing is stripped away from the end of the wire, exposing approximately 0.0625 inches thereof. Once exposed, the wires are twisted together to form a contact therebetween. The wires are then welded to one another using a radiant energy beam system. In one embodiment, the beam is supplied by a laser light source. In an alternative embodiment, the beam is supplied by electron beam. It will be appreciated that other wire sizes may be employed, but in general the smaller wire sizes will provide greater response to temperature changes. On the opposite end, each thermocouple wire is connected to a typical thermocouple jack, having at least two flat connectors extending therefrom to be "plugged" into module 210.

A one-thousandth of an inch diameter (0.001") thermocouple (Tc) wire is commercially available. A fused thermocouple junction diameter of two-thousandths of an inch (0.002) is available. A pressed 0.001" thermocouple sheet material is also available. In accordance with this application, a sheathed thermocouple junction wire is available and easily installed in a drilled hole. A sensor thermocouple junction thermal sensitivity is based on its area and volume. An increase in diameter decreases the sensitivity by the square of the diameter. The sensor thermocouple junction mass is another contributor to the loss in sensitivity. As the thermocouple mass increases the loss in sensitivity is by the cube of the diameter. For example, the diameter ratio of 0.002" (1) to 0.010" (5), is $1^3:5^3$, or 1:125. The thermocouple size increase yields a 125:1 sensitivity loss to define the melt heat content In one embodiment, the ADTECH MTCT-327-C signal transmitter conditions the signal from the Type-J thermocouple and converts it to a digital signal representing temperature. Cold junction compensation and thermocouple linearization is transparent. The transmitter output interfaces to the computer 220 via a serial communications port and provides the data acquisition for the recording system. The data rates are selectable and support update rates of up to 4 samples per second. It will, however, be appreciated that higher rates may provide more data resolution, albeit requiring larger memory for buffering the signals. It should also be appreciated that alternative signal conditioning and storage devices may be employed in place of the Adtech system (e.g., LabView software and associated temperature sensing modules from Nanmac, and Omega).

Although the system may be integrated with mold machine control equipment, the embodiment depicted in FIG. 2 is a stand-alone system. Computer 220 is preferably a Microsoft Windows system having a minimum of 10 MB of free space on the hard drive for the installation of the TeMP•TRIG•SCAN software. Furthermore, a floppy drive (or other removable media drive) may be employed to copy data and screen dumps. Alternatively, the computer could be attached to a network, and the data and graphics uploaded thereto. The data and graphical information may be saved into one of a number of conventional file formats, including .BMP (bitmap) or .WMF (Windows Metafile),. The metafile images are vector based and lend themselves to improved definition when the image is resized.

The settings of the system are taken care of through the software setup dialogs. Setup involves setting the proper communications port and the temperature trigger settings. The software configuration is preset for the communications standards required to communicate to the Adtech MTCT327-C thermocouple transmitter. You only need to tell the software which of the serial ports installed on the computer is being used to collect data from the MTCT-327-C transmitter. This setting is made from the Main Menu→Edit→Serial Communications. In one embodiment a dialog box opens and presents the user with a choice of communication ports, and the user is ready to communicate with the hardware. If the hardware is connected property, and power is applied, the Temperature Edit Box should display the current temperature indicated by the thermocouple(s).

Once the serial communications port is property set, the user determines the operating parameters. These settings are logically grouped into the following sections:

Identification;

High/Low Value Selection;

Graph Information;

Trigger Settings; and

Scan Termination Event. (i.e., time or temperature).

Figure 5:
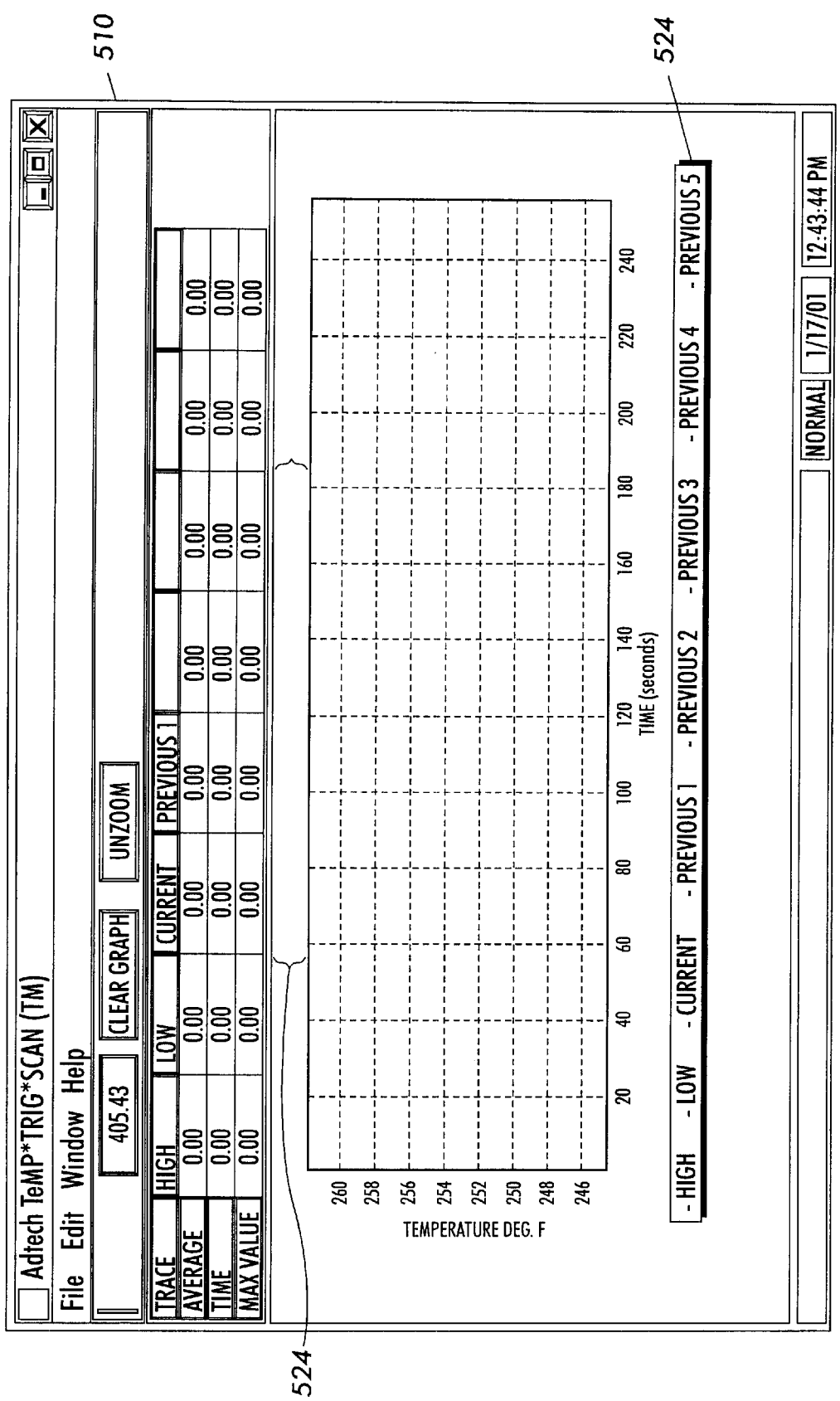
FIG. 5 is an exemplary user interface screen for an embodiment of the present application.

An exemplary user-interface screen for the software is depicted in FIG. 5. In the figure, a screen 510 is used to represent the various pieces of information in the system. For example, the identification field (not shown) is used as a second title line 514 on the output data graph. This information may be employed to represent a particular setup, machine-mold combination, or other defining event or configuration. This value remain until erased or changed. The Data Sample Time controls the data recording rate. When you click on the drop down arrow in the control, a list appears with your choices. The choices range from 250 milliseconds (4 samples per second) to 5000 milliseconds (or 0.5 samples per second). It will be appreciated that additional time ranges may also be employed, and that the greater the resolution the greater the storage requirements for the temperature-time data.

The High/Low Value selection region of the interface allows the user to select which trace is kept as the "High" and "Low" trace for comparison to a current profile. If the user selects average, then the average value of the trace over it's recorded time will be compared against the current trace average to determine if it will be kept as the "High" or "Low" trace. Likewise, a user could select the maximum or peak value to determine the "High" or "Low" trace.

In one embodiment, there are multiple "standard" profiles defined for use. Examples include High, Low, Current, Previous 1, Previous 2, Previous 3, Previous 4 and Previous 5. The display type may be obtained by simply selecting on the type along the bottom of the interface in region 524. The graph information box in the settings dialog allows you to change the labels of the traces, and also to select if the trace is "active." Changing the information to identify specific conditions on a graph for printing, or saving (as in a snapshot) is useful, and the primary purpose for having access to this information. You can also selectively turn traces on (i.e., display the trace) or turn them off by toggling the "Active" check box associated with a trace.

The trigger setting panel of the interface includes at least editable values: Primary Temp; Secondary Temp; Termination Temp; and Record. The trace trigger event is always initiated by the temperature rising trough the Primary Temp value. When a trigger occurs, the following sequence is initiated in a current embodiment of the software 1) The traces are indexed (i.e., the current trace moved to the Previous I trace, etc. and oldest trace is lost or moved to permanent storage).

2) The Current High/Low Value Selection variable (either Average or Max Value) is compared to the existing High Trace values. If it is higher than the High Trace value, then the High Trace is replaced by the current trace.

3) The Current High/Low Value Selection variable (either Average or Max Value) is compared to the existing Low Trace values. If it is lower than the Low Trace value, then the Low Trace is replaced by the current trace.

4) The Current Trace is cleared and new values are recorded.

The trace keeps recording until the termination event occurs. If the Scan Termination Event is Temperature, then the Termination Temp edit box is active and the Record Time edit box is not active (edit box and text are grayed). The Termination Event occurs when the measured temperature falls through the Termination Temp value. If the Scan Termination Event is Time, then the recording process continues until the recorded trace time meets or exceeds the Record Time value.

Figure 6:
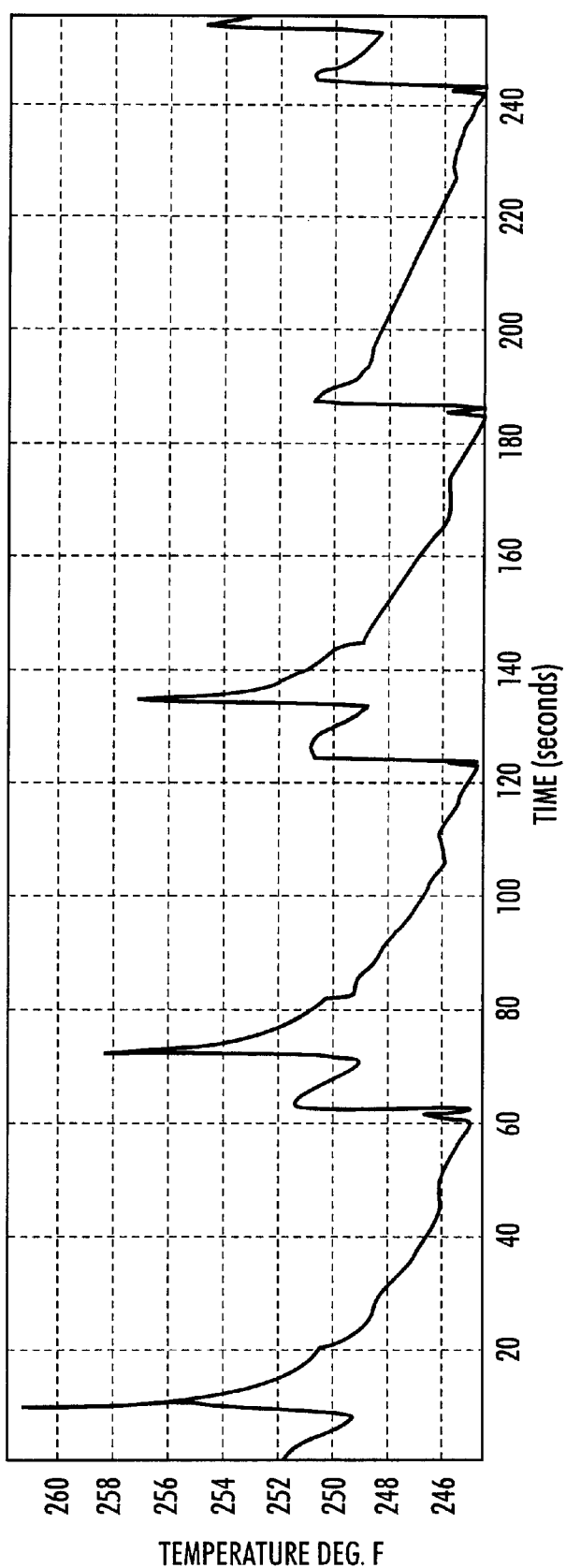
FIG. 6 is an enlarged view of a portion of the user interface screen depicted in FIG. 5.

An exemplary representation of the temperature-time profile is illustrated in FIG. 6. In the figure, a screen 610 is created, where the temperature-time profile for at least one mold cycle 614 is illustrated. Such an illustration would be depicted, for example, in region 530 of FIG. 5.

The main screen is broken down into the menu bar, task bar, trace data, the graph, and the status bar. The trace data in region or area 530 presents a summary of the graph data. When a new recording begins, the current trace is compared with the high and low trace to determine if a new high or low trace occurred. If it did, then the appropriate trace is replaced by the current trace. After that, each of the previous traces are shifted to the right, and the last one is dropped. Referring to FIG. 6, the Graph displays the recorded data for the current recording, and up to five previous recordings. In addition, the previous high trace, and the previous low trace are kept. Up to a total of eight recordings can be viewed simultaneously, although it will be appreciated that alternative display schemes, windows and other features may be included in the software. It may also be possible to store data in order to acquire run-trend averages for a series of mold cycles.

As will be seen from profile 612 in FIG. 6, the temperature of the melt flow may be monitored and displayed. More importantly, one or more of the peaks in temperature, over a molding cycle 620 is believed to be the result of a temperature increased caused by increased pressure in the area of the thermocouple, pressure caused by the melt material being subjected to further restrictions as it is injected into the sprue, runner, gates, cavities, etc. For example, peaks 630 are a result of the melt material hitting the gate restrictions (second pressure-volume rise), whereas peaks 640 are believed to be a result of the mold packing (third pressure-volume rise) as previously described.

Accordingly, in one embodiment of the present invention, the third melt pressure-volume "rise" 640 depicted in the temperature profile may be used to trigger or initiate a mold gate cut-off signal and cause gates to close in the cavities. In response reaching a temperature set-point a gate close signal is sent from a processor, the gate pin in each cavity would be rotated, so the gate melt-flow is stopped. The temperature set-point range is from just filled to moderate fill/pack or full melt cavity volume pack. The temperature set-point range determines the degree of part density and thermal elastic strain imposed in the cured part. This means of monitoring the pressure-volume temperature "rise" in each cavity volume allows the use of unbalanced cavities, thereby widening the acceptable variances in machined cavities, material melt-flow index, mold temperature, and machine processing conditions. In a similar fashion, profile region 640 may be employed to control the molding strain in a part—by setting a gate trigger point ahead of temperature 640.

After the melt injection stage is complete and the molded part melt is curing, the screw returns for another melt shot size 49. By using the screw rotation work temperature "rise" monitored by the barrel melt edge sensor array (Bme'S-A), the material to melt conversion can be measured in barrel section 200 (see FIG. 3).

In yet a further aspect of the present invention, the thermocouples 340 and 342 of FIG. 3A, referred to herein as the barrel sensor array senses a pulsed profile as the screw flites and groove material/melt temperature profile is read and sent to the microprocessor. The barrel sensor array reveals the dynamic melt/screw mixing work energy from the rear to front sections, as each melt shot is generated. The screw stops rotating when the rear shot size position is reached. The now static screw contains a material/melt mixture where fluctuating heat is added from external barrel heaters. The contained material, melt/screw flite, and shot size are heated on the outer surface. The barrel heater input to its inside diameter conduction to the screw steel flites and groove material/melt exterior is monitored by the edge barrel sensor array. The material being converted to a melt and final shot size 49 outer surface insulator the inner melt. Thus, the inner melt volume is isolated for the barrel heater temperature and fluctuations.

As a melt inject cycle starts, the screw pushes forward to extrude a melt shot out the nozzle orifice. The screw flites and contained groove material/melt will reflect a fairly stable initial to final barrel temperature profile. The major benefit of the nozzle orifice and cavity gate restriction is the added "shear" heat that blends an injected melt-flow volume into a final melt/mold cavity volume.

Interruption in the cyclic (open-close) machine-melt-mold process rhythm is a critical parameter as cited in U.S. Pat. No. 5,283,018 to Fanuc. Implementing a self-startup molding process can be achieved if all the influencing process parameters are accounted for. Furthermore, engineering and optical melt materials must be preheated before being loaded into a machine hopper. The hopper material is preferably maintained in a "dried" state. Therefore, the machine hopper temperature and humidity must be monitored and controlled, if the desired material-pellet-hopper state upper and/or lower limit is lost, the molding process must be indicated as being out the established process control "window" (temperature sensor array vs. time).

A similar factor in the molding process, the hydraulic oil 332 contained in the machine oil sump, must be at or within a preferred operating temperature range of 120° F. (±5° F.). A colder machine hydraulic fluid (e.g., starting at site temperature) has a slower cyclic mechanical rhythm than a warm fluid. As the oil temperature in a hydraulic sump overheats, for example from a heat exchanger failure, a machine's mechanical response speeds up. If the hydraulic fluid continues to overheat, the working oil starts to "varnish" in the pumps and may impair the function or destroy the machine's hydraulic system.

Having described the basic operation of the present invention, and a software system implementing various process steps associated therewith, attention is now turned to specific aspects pertaining to the use of thermocouples in association with a molding machine. In particular, aspects of the present invention are directed toward preferred embodiments for the insertion of thermocouples in order to sense edge and inner melt temperatures.

Figure 7:
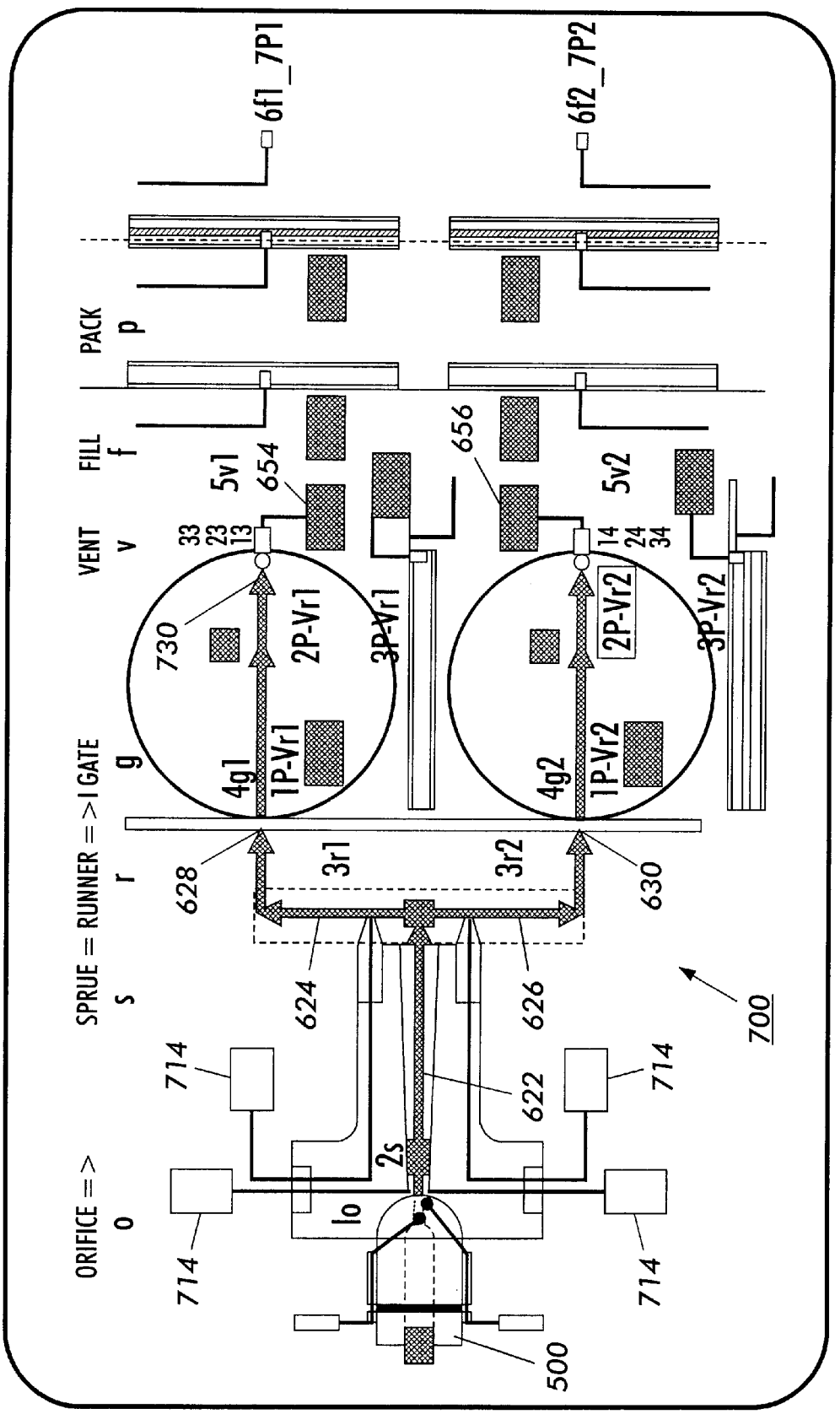
FIG. 7 illustrates an Orifice Melt to Mold sprue, runner, gate, vent, fill/Pack Melt Flow cycle in a molding system.

FIG. 7 is an illustration of a preferred sprue assembly 700 to receive an injection melt from a molding machine nozzle 500 and including means for inserting thermocouples therein to directly sense a melt-flow temperature. If the mold cavity sprue (s), runner (r), gate (g), and cavity vent (v), fill (f), and pack (p) melt-flow volume is balanced, the melt-flow edge and impinge temperature sensors trigger temperature-time sequence would be the same. An imbalanced mold cavity melt flow is shown in the top cavity, as shown by gray arrow 730. The melt-flow edge and impinge trigger times for each cavity will, therefore, be different in accordance with an aspect of the present invention. The difference will be noted at the start molding process profile range for each cavity. The difference may be caused by mold cavity temperature differential, mold clamp force difference (lower clamp force allows a faster fill), a larger cavity gate area has a higher melt-flow rate, for a faster fill to pack volume. With final melt packing, there will be a difference in cavity volume and density. In some cases, this may be within the molded product specification.

In one embodiment of the present invention, the inner thermocouple is preferably inserted into the melt flow cavity in order to sense, directly, the temperature of the mold material flowing past the thermocouple. As will be appreciated by those knowledgeable in injection molding techniques, simply inserting the thermocouple into the melt flow would subject the thermocouple to sever loads. Hence, the thermocouple must be supported in the melt flow. However, the support mechanism must be of reduced size so that it does not significantly impair the flow of melt material in the opening, and so that it does not impact the ability of the thermocouple to sense temperature variations due to pressure changes.

Figure 8:
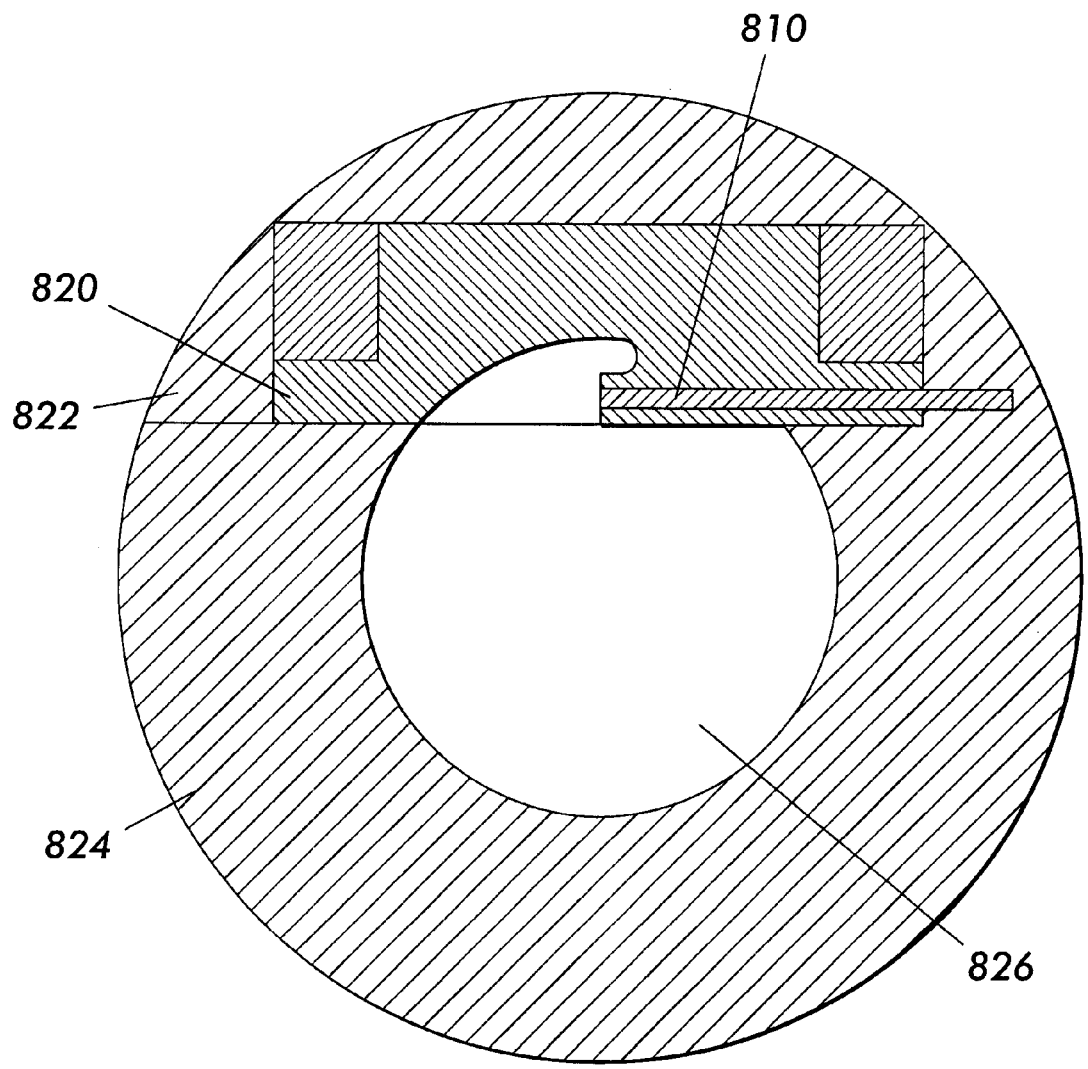
FIG. 8 is a cross-sectional illustration of an embodiment of the present invention for inserting a thermocouple into the melt flow.
Figure 9A:
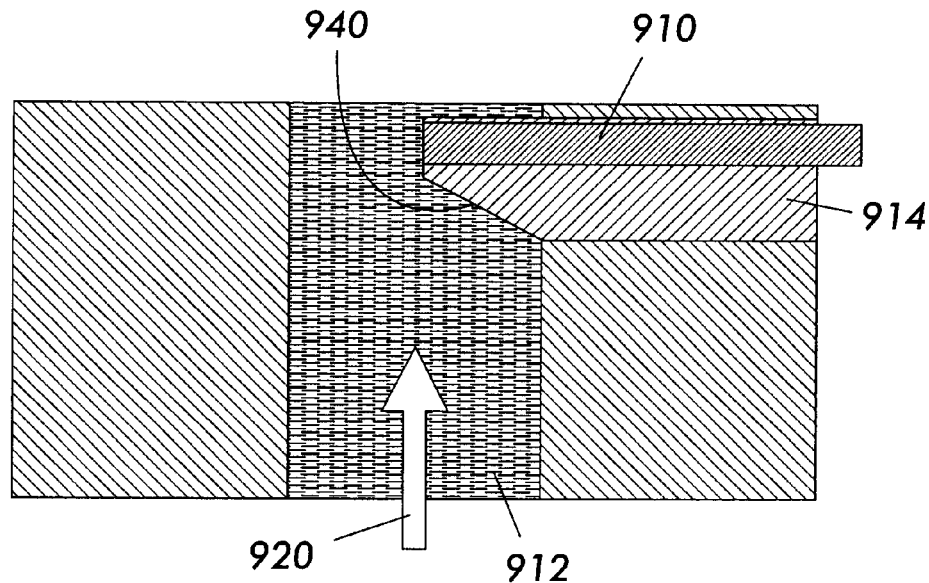
FIGS. 9A, 9B, 10A, 10B, 11A and 11B illustrate various alternative embodiments for inserting the thermocouple into the melt flow in accordance with an aspect of the present invention.
Figure 9B:
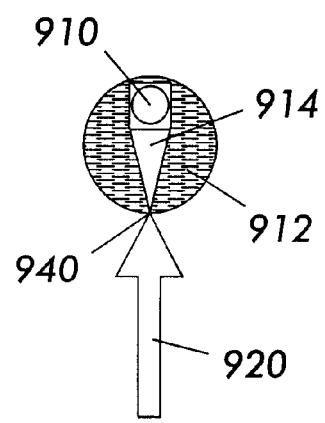
Figure 10A:
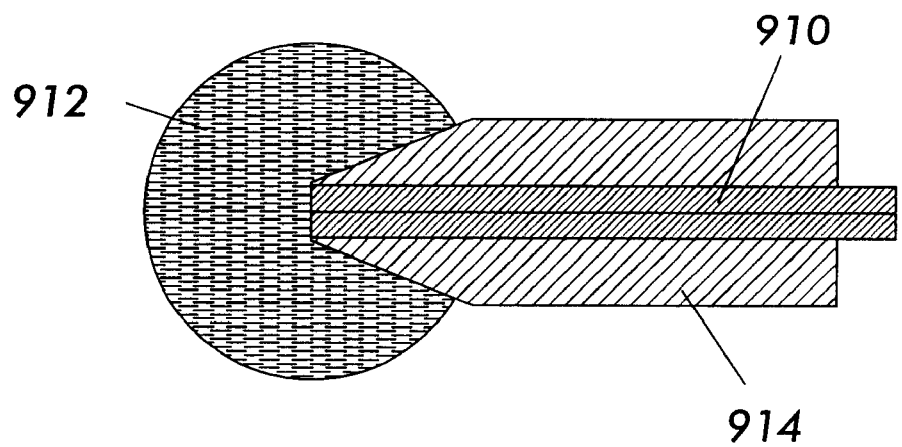
Figure 10B:
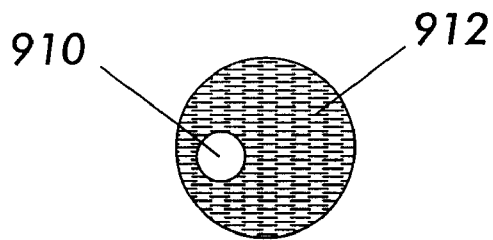

Accordingly, the thermocouple is preferably of a small size and is supported by a pin or "tooth" within the melt flow. For example, referring to FIG. 8, there is depicted one embodiment of the thermocouple mounting mechanism. A thermocouple 810, prepared in accordance with the prior description is inserted within a semi-permanent tooth or pin 820 and the pin, in turn, is inserted within the a hole 822 that extends into a bore or orifice 826 of the mold machine 824 (e.g., nozzle, sprue, runner, etc.). It is also conceivable that the pin may be replaced by a square or alternatively shaped key or equivalent mechanism, however, a round pin was most expedient. In a preferred embodiment, the pin, once having a thermocouple inserted therein, is inserted into the mold or mold machine, and is brazed or soldered to retain it therein. While it may also be possible to affix the pin/thermocouple combination using pressure fits, threads, or similar techniques, the use of a semi-permanent brazing or soldering appears to be the most reliable to maintain the pin/thermocouple in the desired yet not provide a leakage point for the melt material. It will be further appreciated that the embodiment of FIG. 8 may be employed in any of the generally cylindrical bores or openings in a mold machine nozzle, nozzle extension, sprue, runner or other portions of the mold. It is also possible to utilize a similar technique to affix edge sensors to the various component, albeit without extending the thermocouple junction into the melt material flow.

Turning next to FIGS. 9A–11B, depicted therein are details relating to the installation of the thermocouple in accordance with yet another embodiment of the present invention. In particular, as shown in cross-sectional view 9A, the thermocouple 910 is inserted into a channel 912 or orifice of the molding machine. The thermocouple is supported at the end of a tapered pin, whereby material flowing in the direction of arrow 920 passes a lead edge of the tapered pin. In this manner, the pin itself bears the force of material impinging on it, whereas the thermocouple is protected somewhat from the force of the melt flow. In the event the thermocouple is to be employed within the mold itself, it may also be possible to utilize the thermocouple without a pint to support it (due to the lower forces from melt material in a mold cavity.

Figure 11A:
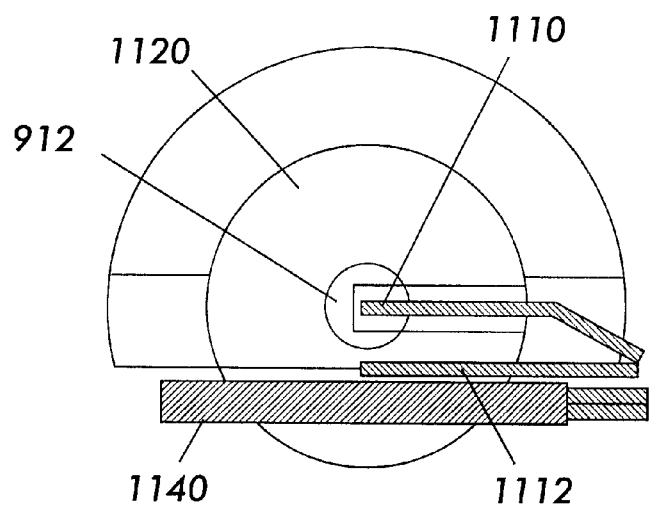
Figure 11B:
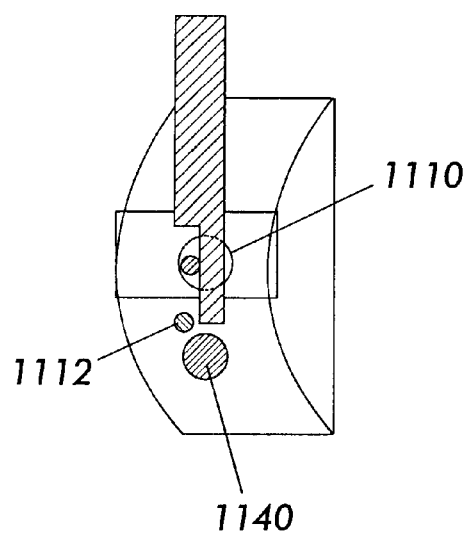

Referring briefly to FIGS. 11A and 11B, the pin/thermocouple combination 1110 (having a diameter of approx. 0.120 inches) is inserted within the melt flow channel or orifice 912, for example in a sprue, nozzle or nozzle insert 1120. A similar thermocouple 1112 is inserted into the sprue along with an associated heater 1140. The thermocouple 1112 may also be incorporated within the heater or its associated package. The thermocouple 1112 is intended to monitor the heater in order to provide a means for controlling the heater temperature. As previously noted, the heater is employed to maintain the temperature of that portion of the molding machine adjacent the thermocouple. For example, the area of the nozzle or sprue, which is subject to cooling when the mold is in an OPEN state.

In summary, the present invention relies on an improved thermocouple that may deployed into the melt flow of a molding machine in order to monitor the temperature of the melt, and to sense, via temperature increases, when the pressure of the melt material changes. Furthermore, while it is believed preferable to employ a thermocouple within the melt flow, it may also be possible to sense sufficient changes in temperature using a thermocouple positioned along the edge of a melt flow channel or orifice, or within the mold cavity itself.

It is, therefore, apparent that there has been provided, in accordance with the present invention, a method and apparatus for controlling a mold flow process using temperature sensors. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A method for continuously characterizing the conversion of a material to a melt in a molding machine having a barrel for feeding a nozzle, where the nozzle feeds melt material to at least one mold cavity via a sprue and runner, so as to enable control of at least one element of the molding machine using a thermal sensor, including the steps of:

monitoring the temperature of a melt material at at least one location between the barrel and the mold;

characterizing the mold cavity volume as a function of the temperature of the at least one location therein using at least one thermal sensor within the mold cavity;

characterizing, in a screw and barrel assembly of the molding machine, the thermal enthalpy of the screw and barrel assembly via thermal sensors in direct contact with material drawn from a hopper into the barrel via the screw, where the thermal sensors characterize a thermal exchange between the material, the screw, and the resulting melt within the barrel;

monitoring the temperature of a nozzle orifice adjacent an open end of the barrel;

tracking the change in nozzle orifice area from an initial setup area to a final exit as a function of the nozzle orifice temperature; and characterizing the mold cavity volume as a function of the temperature of at least one location therein.

2. A method for continuously characterizing the conversion of a material to a melt in a molding machine having a barrel for feeding a nozzle, where the nozzle feeds melt material to at least one mold cavity via a sprue and runner, so as to enable control of at least one element of the molding machine using a thermal sensor, including:

monitoring the temperature of a melt material at at least one location between the barrel and the mold; and characterizing the mold cavity volume as a function of the temperature of the at least one location using only a thermal sensor;

characterizing the barrel melt orifice flow inner flow as a function of temperature; characterizing the barrel melt orifice flow edge surface to mold thermal exchange rate;

characterizing the melt center to edge differential cure rate; and characterizing the molded part inner-to-edge thermal differential during mold OPEN.

3. A method for continuously characterizing the conversion of a material to a melt in a molding machine having a barrel for feeding a nozzle, where the nozzle feeds melt material to at least one mold cavity via a sprue and runner, so as to enable control of at least one element of the molding machine using a thermal sensor, including the steps of:

monitoring the temperature of a melt material at at least one location between the barrel and the mold cavity, wherein monitoring the temperature of at least one location includes placing a junction of a thermocouple within the melt flow, where the thermocouple junction is exposed directly to the melt flow, and further comprises the steps of reading, over a series of sequential time intervals, the temperature of the melt material at the location via a temperature signal output by a thermocouple placed at the location, storing the temperature signal for each time interval, and creating, from the series of sequential temperature signals, a temperature-time profile for the location; and characterizing the mold cavity volume as a function of the temperature of the at least one location using only the thermocouple.

4. The method of claim 3, wherein monitoring the melt temperature of the at least one location includes the placement of a thermal sensor in location selected from the group consisting of:

inside a nozzle;
inside a nozzle extension;
inside a sprue;
inside a cold/hot runner system;
inside a gate(s);
inside a mold cavity; and
end of cavity vent area.

5. The method of claim 3, further comprising the step of heating a region of the molding machine adjacent the thermocouple location so as to minimize the thermal variation of the melt flow therein and to reduce the forces applied to the thermocouple.

6. The method of claim 3, further comprising the step of producing the thermocouple junction using a radiant beam welding technique to electrically and mechanically join two dissimilar metals.

7. The method of claim 3, further comprising the steps of:

producing the thermocouple junction by placing an iron wire and a constantan wire adjacent one another so that the ends and a portion thereof are in contact;

heating the ends and at least one additional point near the end of the wires using a radiant beam energy heat source, wherein a junction is created between the wires, and where the result of the radiant beam heating further heat treats the wires and the junction therebetween to provide improved resistance to damage of the junction.

8. A method for continuously characterizing the conversion of a material to a melt in a molding machine having a barrel for feeding a nozzle, where the nozzle feeds melt material to at least one mold cavity via a sprue and runner, so as to enable control of at least one element of the molding machine using a thermal sensor, including:

monitoring the temperature of a melt material at at least one location between the barrel and the mold;

characterizing the mold cavity volume as a function of the temperature of the at least one location using only a thermal sensor; and controlling the gating of at least one of a plurality of cavities in a multi-cavity mold in the molding machine, wherein the step of controlling the gating comprises characterizing a molding process using at least one thermocouple within each of the plurality of cavities, wherein the characterization records the temperature within the cavity as a function of time to produce a temperature-time profile, using the temperature-time profile to identify a control trigger-point for at least one of the plurality of cavities, monitoring the temperature of at least one of the plurality of cavities during a subsequent molding cycle, and controlling the gating of the at least one of a plurality of cavities in accordance with the control trigger-point.

9. An injection molding system having a barrel for feeding a nozzle, where the nozzle feeds melt material to at least one mold cavity via a sprue and runner, and an automated means for characterizing the conversion of a material to a melt in the molding machine, including:

a thermocouple for monitoring the temperature of the melt material in at least one location of the molding machine, wherein a junction of the thermocouple is exposed to the melt material; and a programmable device with associated memory, connected to said thermocouple, for periodically receiving a signal generated by the thermocouple and recording said signal as an indication of the temperature, wherein the programmable device is capable of creating a representation of the temperature as a function of time and wherein said representation is capable of representing a pressure increase within the melt material as a temperature rise.

10. The injection molding system of claim 9, wherein monitoring the temperature of melt material in at least one location includes:

placement of a thermal sensor in at least one of the following locations:
inside a nozzle;
inside a nozzle extension;
inside a sprue;
inside a cold/hot runner systems;
inside a gate(s);
inside a mold cavity; and
end of cavity vent area.

11. The system of claim 10, wherein the thermocouple junction is formed using the steps of:

placing an iron wire and a constantan wire adjacent one another so that the ends are in contact;

heating the contact point using a radiant beam energy heat source, wherein a junction is created between the wires, and where the result of the laser heating further heat treats the wires and the junction therebetween to provide improved resistance to damage of the junction.

12. The system of claim 9, wherein the thermal sensor is a thermocouple and monitoring the temperature of at least one location includes placing a junction of the thermocouple within the melt flow.

13. The system of claim 12, further comprising at least one heater for heating a region of the molding machine adjacent the thermocouple location so as to minimize the thermal variation of the melt flow therein and to reduce the forces applied to the thermocouple.

14. The system of claim 12, wherein the thermocouple junction is formed using a laser welding technique to electrically and mechanically join two dissimilar metals.

15. The system of claim 9, further including automated means for controlling the gating of at least one of a plurality of cavities in a multi-cavity mold in the molding machine, wherein the automated means for controlling the gating comprises:

at least one thermocouple located within each of the plurality of cavities, wherein the automated means records the temperature within the cavity as a function of time to produce a temperature-time profile;

memory for storing the temperature-time profile;

a programmable processor for analyzing the temperature-time profile to identify a control trigger-point for at least one of the plurality of cavities; and a gate control switch, for controlling the gating of the at least one of a plurality of cavities, wherein the gate control switch is under the control of the programmable processor which is responsive to the identification of the control trigger-point.

16. An injection molding orifice temperature sensor, including:

a melt orifice, positioned such that melt material flows past said orifice under normal injection molding parameters;

an unsheathed thermocouple suitable for insertion into said orifice so that the thermocouple is an impinge temperature sensor, where a junction of the thermocouple is in direct contact with a melt material flowing in an injection molding system; and means for retaining the thermocouple in the orifice.

* * * * *